Aug. 27, 1935.  A. G. F. WALLGREN  2,012,841

BEARING

Filed April 19, 1934

INVENTOR
August Gunnar Ferdinand Wallgren
BY
Wm. J. Hedlund
his ATTORNEY

Patented Aug. 27, 1935

2,012,841

UNITED STATES PATENT OFFICE 2,012,841

BEARING

August Gunnar Ferdinand Wallgren, Stockholm, Sweden, assignor to Aktiebolaget Nomy, Stockholm, Sweden, a corporation of Sweden Application April 19, 1934, Serial No. 721,273
In Sweden April 29, 1933

29 Claims. (Cl. 308—160)

My invention relates to bearings and more particularly to thrust bearings of the sliding block type which are adapted to rotate in either direction.

A bearing of this type includes two axially spaced bearing members, one arranged to rotate with the shaft to be supported and the other arranged stationary. Between these bearing members there are provided a plurality of bearing blocks which are substantially stationary with respect to one of the members and rotate with respect to the other member. The first mentioned member and the blocks have cooperating surfaces which are arranged to cause tilting of the blocks in one direction upon rotation of the shaft in one direction and opposite tilting of the blocks upon rotation of the shaft in the opposite direction. Means are provided for allowing a slight shifting of the blocks with respect to the first mentioned member upon a reversal of direction of rotation in order that the aforesaid tilting may take place.

Inasmuch as all of the blocks in a thrust bearing may be normally under load, it is preferable to provide means for unloading the blocks successively in order that they may be able to shift position upon a reversal of rotation. In my Patent No. 1,920,727, issued August 1, 1933, there is disclosed a bearing of this type in which unloading of the blocks is accomplished by forming one or more depressions in the bearing surface of the stationary bearing member. Thus, when the blocks pass over these depressions the load on them is relieved and they are able to shift with respect to the rotating bearing member if a reversal in direction of rotation has just taken place.

Among the objects of the present invention is to provide means whereby the blocks may be successively unloaded without resorting to the formation during manufacture of the bearing of depressions or other irregularities in the bearing surface of the stationary bearing member. This is accomplished by providing a deformable zone or zones in the stationary bearing member, either by weakening certain portions of the stationary bearing member or by making the entire member weak enough to be deformed at any unsupported point and leaving certain portions of the member unsupported so that it will thus be deformable.

Further objects and advantages will appear from the following description considered in connection with the accompanying drawing which forms a part of this specification and on which:

Figure 1:
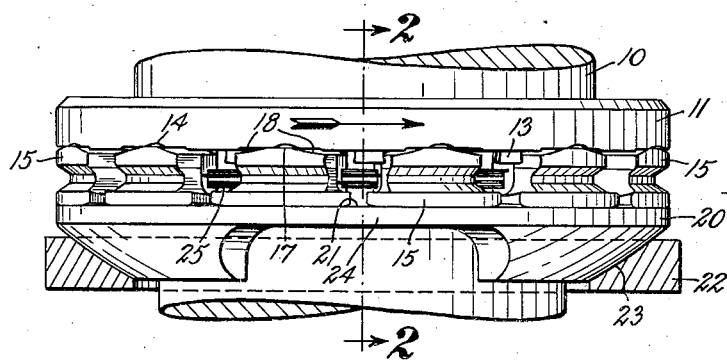
Fig. 1 is a side view of a preferred embodiment of my invention with one of the members in cross-section.
Figure 2:
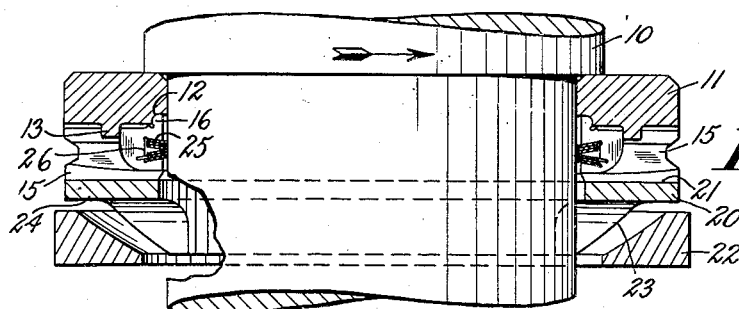
Fig. 2 is a cross-sectional view taken on the line 2—2 of Fig. 1.
Figure 3:
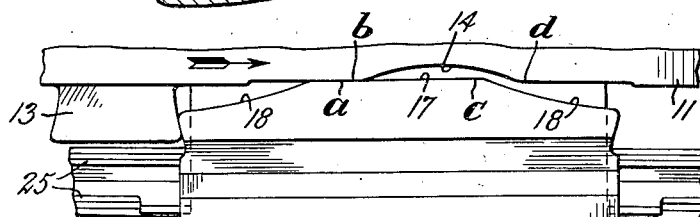
Fig. 3 is an enlarged detail view of a portion of the bearing shown in Figs. 1 and 2.

Referring more particularly to Figs. 1 and 2, reference character 10 designates a shaft which is subjected to a thrust load directed downwardly, as viewed in the figures. Rigidly secured to shaft 10 in any suitable manner is a rotatable bearing ring 11. Ring 11 is formed with an inner annular groove 12 at one edge thereof. The surface of one face of ring 11 is provided with a plurality of axially extending and peripherally spaced projections 13, which alternate with radially extending grooves 14. A plurality of bearing blocks 15 are located between projections 13. The length of each block is slightly less than the peripheral distance between adjacent projections, so that the blocks may shift their position slightly with respect to the bearing member 11, this shifting being limited by the projections 13. Projections 13 thus serve as abutments and cause the blocks to rotate with member 11. Each block is provided with a ridge-like portion 16 which extends into the groove 12 and prevents radial displacement of the blocks, which would otherwise be caused by centrifugal force. As is clearly shown in Fig. 3, the surface of each block which contacts and cooperates with the face of bearing member 11 is formed with a flat central portion 17 and slightly inclined end portions 18. When the bearing rotates in the direction indicated by the arrows in Figs. 1 and 3, the left hand end $a$ of the flat surface 17 bears against the shoulder $b$ on the member 11 adjacent the left hand side of groove 14, as viewed in Fig. 3, and the right hand end $c$ extends into the groove. This causes the thrust load to be applied to the left of the center of the block which results, upon rotation of the bearing, in the tipping of the block to form a wedge-shaped space 19, shown in exaggerated form in Fig. 3. Upon reversal of direction of rotation of the shaft, and consequently of bearing member 11, the blocks shift slightly with respect to the bearing member so that the end $c$ of the flat surface 17 is in contact with the shoulder $d$ on the member 11 and the end $a$ of the surface extends into the groove 14. Hence, the load is applied to the right of the center of block 15 and, upon rotation, the block will tilt in the opposite direction. The wedge-shaped space 19 serves to aid in the formation and retention of a wedge-shaped load transmitting film of lubricant between the bearing blocks and the stationary bearing member.

The stationary bearing member 20 has a smooth uninterrupted bearing surface 21 with respect to which the bearing surface of the blocks 15 slide. During operation there is actually no metal-to-metal contact between the blocks and the member 20 due to the aforementioned wedge-shaped films of lubricant.

In order to allow for a slight misalignment of the shaft, the stationary bearing member 20 is supported by a stationary supporting member 22 with respect to which it may have universal movement by virtue of the cooperating spherical surfaces 23 of the two members. The supporting member 22 may be secured within a bearing housing or otherwise rigidly supported.

In order to facilitate shifting of the blocks with respect to the rotatable bearing member 11 upon reversal of rotation, in order to accomplish reversal of tilting, it is desirable to successively unload the blocks. In accordance with the present invention this unloading of the blocks is accomplished by providing one or more deformable zones 24 in the stationary bearing member 20. This is done by making the ring of less total thickness in one or more portions than in the majority of portions of the member. The weakened or deformable zone should have a peripheral extent at least greater than the length of one of the bearing blocks and preferably between two and two and a half times the length of a block. In the embodiment shown, two weakened zones 24 are provided, as appears in Fig. 2.

Figure 4:
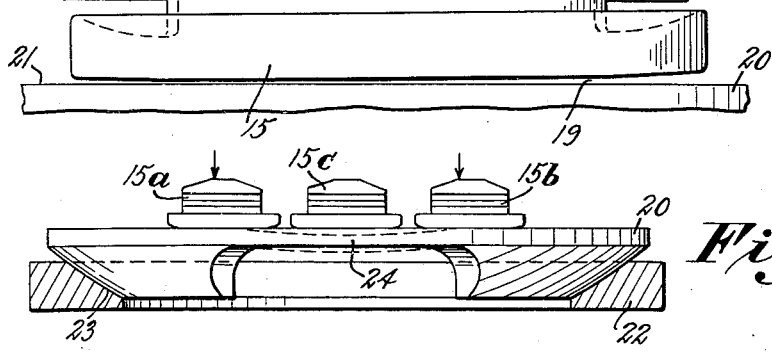
Fig. 4 is a view of a portion of the bearing as shown in Fig. 1, illustrating, in exaggerated form, the deformation of the bearing member.

Fig. 4 shows in an exaggerated manner, the way in which the deformable zones 24 effect the successive unloading of the blocks. Blocks 15a and 15b are each over one end of the deformable zone 24, while the block 15c is in the center of the zone. The axially acting loads on the blocks 15a or 15b cause them to slightly deform the material of the member 20 in the weakened zone 24. This results in the block 15c being unsupported by the member 20 and consequently unloaded. It is therefore free to shift its position with respect to the rotatable bearing member 11 if the direction of rotation has just changed. As each block passes through the deformable zone 24 it is free to shift its position in the same manner as just described in connection with block 15c.

Retaining rings 25 are advantageously employed to connect diametrically opposed blocks 15 and to prevent relative rotation of these blocks. In other words, diametrically opposed blocks must shift their position together. These rings are located in a groove 26 formed in each of the bearing blocks. In the embodiment shown, twelve bearing blocks are provided and hence six retaining rings are required. Because of the retaining rings, it is necessary to provide diametrically opposed deformable zones in the bearing member 20 in order that diametrically opposed blocks may shift concurrently, upon a reversal of rotation.

The retaining rings 25 have a dual function. In the first place, these rings prevent the bearing blocks from falling out of the bearing in case of disassembly. Secondly, they prevent the bearing blocks from assuming incorrect positions. As will be evident from Fig. 2, the individual blocks are retained in assembled relation with respect to the carrier ring due to the dished form of the outer rings 25. These rings are advantageously made of elastic material so that the blocks may be attached or removed by snapping them on or off these resilient rings. The retaining rings operate to prevent the blocks from assuming incorrect positions due to the interconnection, by means of each ring, of opposed blocks. The manner in which this is effected is as follows. Suppose that the bearing is associated with a horizontally arranged shaft so that the faces of the bearing members are vertical, and that the direction of rotation of the shaft is as indicated by the arrows in Figs. 1 and 2. Under these conditions, the bearing blocks as they move downwardly are in a position such that surfaces $a$ and $b$ are in contact, these surfaces being above the center of gravity of the blocks. As each successive block passes downwardly into the unloaded zone provided by the deformable portion 24, the tendency of the block is to shift its position, due to gravity, so that surfaces $c$ and $d$ are in contact and the lower end of the block is in contact with the adjacent projection 13. If this occurred, each block, after passing downwardly through the unloaded zone, would enter the next loaded zone tilted in the wrong direction. The above undesirable shifting of the blocks is prevented due to the interconnection of two opposed blocks. Frictional forces tend to keep the blocks in their proper position and with two diametrically opposed blocks held against relative rotational movement with respect to each other by the retaining rings, the tendency of any block passing downwardly into the unloaded zone at one side of the bearing to drop due to gravity is counterbalanced by the weight of the oppositely disposed bearing block held by the same retaining ring, which latter block is passing upwardly through an unloaded zone provided by the deformable portion at the other side of the bearing and hence is acted upon by gravity to retain it in its proper position. Since the frictional resistance on all blocks tends to maintain them in proper position and, since the forces of gravity tending to shift the blocks from proper position are neutralized, the blocks are retained, during their passage through the unloaded zone, in their proper positions with respect to the carrier ring.

Figure 5:
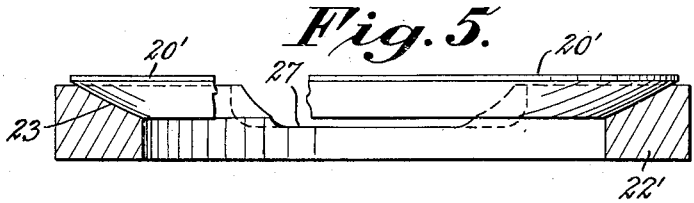
Fig. 5 is a view, partially in cross-section, of a portion of a bearing in accordance with a modification of my invention.

In the modification shown in Fig. 5, the stationary bearing ring 20' is made of the same thickness all around and this thickness is such that the ring is deformable under the loads which the bearing is adapted to carry if it is not uniformly supported. The supporting member 22' is accordingly formed with a cut-away portion 27 in the surface thereof which contacts bearing member 20'. Thus, there is provided an unsupported portion of the bearing member, which portion is deformable to effect unloading of the bearing blocks as they pass through this zone. Preferably, two diametrically opposed cut-away portions 27 are provided in order that diametrically opposed blocks will be unloaded at the same time so that they may shift their positions concurrently.

While I have shown two more or less specific embodiments of my invention, it is to be understood that they are for purposes of illustration only and that other arrangements may be employed for weakening a certain portion or portions of the bearing member so as to provide a deformable zone or zones therein. Consequently, my invention is not to be limited by the modifications illustrated, but its scope is to be determined by the appended claims viewed in the light of the prior art.

What I claim is:

1. A bearing of the character described comprising relatively rotatable bearing members, a plurality of bearing blocks having operative positions between said members, one of said members and said blocks having cooperating surfaces for causing rotation in one direction to tilt the blocks one way and rotation in the other direction to tilt the blocks the other way, means for permitting and limiting shift of position between said blocks and said one of said members, the other of said members and said blocks having cooperating bearing surfaces, the bearing surface of said other of said members being smooth and uninterrupted, and means providing an unloaded zone for facilitating said shift of position upon reversal of direction of rotation of the bearing.

2. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, and means providing an unloaded zone for facilitating said shift of position upon reversal of direction of rotation of the bearing.

3. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, and a stationary supporting member for supporting said stationary bearing member, one of said stationary members being formed with a portion of reduced thickness so as to provide a deformable zone in said stationary bearing member for facilitating said shift of position upon reversal of direction of rotation of the bearing.

4. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, and said stationary bearing member being formed with a portion of reduced thickness so as to provide a deformable zone therein for facilitating said shift of position upon reversal of direction of rotation of the bearing.

5. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, and a stationary supporting member for supporting said stationary bearing member, said supporting member being formed with a portion of reduced thickness so as to provide an unsupported deformable zone in said stationary bearing member for facilitating said shift of position upon reversal of direction of rotation of the bearing.

6. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, and a stationary supporting member for supporting said stationary bearing member, one of said stationary members being formed with a portion of reduced thickness, said portion having an extent substantially greater than that of one of said blocks so as to provide a deformable zone in said stationary bearing member for facilitating said shift of position upon reversal of direction of the rotation of the bearing.

7. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, and a stationary supporting member for supporting said stationary bearing member, one of said stationary members being formed with a plurality of portions of reduced thickness so as to provide a plurality of deformable zones in said stationary bearing member for facilitating simultaneous shift of position of a plurality of said blocks upon reversal of direction of rotation of said bearing.

8. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, and a stationary supporting member for supporting said stationary bearing member, one of said stationary members being formed with a plurality of portions of reduced thickness, each of said portions having an extent substantially greater than that of one of said blocks so as to provide a plurality of deformable zones in said stationary bearing member for facilitating simultaneous shift of position of a plurality of said blocks upon reversal of direction of rotation of said bearing.

9. A bearing of the character described comprising relatively rotatable bearing members, a plurality of bearing blocks having operative positions between said members, one of said members and said blocks having cooperating surfaces for causing rotation in one direction to tilt the blocks one way and rotation in the other direction to tilt the blocks the other way, means for permitting and limiting shift of position between said blocks and said one of said members, the other of said members and said blocks having cooperating bearing surfaces, the bearing surface of said other of said members being smooth and uninterrupted, and means providing a plurality of unloaded zones for facilitating simultaneous shift of position of a plurality of said blocks upon reversal of direction of rotation of said bearing.

10. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, and means providing a plurality of unloaded zones for facilitating simultaneous shift of position of a plurality of said blocks upon reversal of direction of rotation of said bearing.

11. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, and a stationary supporting member for supporting said stationary bearing member, said supporting member being formed with a plurality of portions of reduced thickness so as to provide unsupported deformable zones in said stationary bearing member for facilitating simultaneous shift of position of a plurality of said blocks upon reversal of direction of rotation of said bearing.

12. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, and said stationary bearing member being formed with a plurality of portions of reduced thickness so as to provide a plurality of deformable zones therein for facilitating simultaneous shift of position of a plurality of said blocks upon reversal of direction of rotation of said bearing.

13. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, a stationary supporting member for supporting said stationary bearing member, one of said stationary members being formed with diametrically opposed portions of reduced thickness so as to provide diametrically opposed deformable zones in said stationary bearing member for facilitating shift of position of diametrically opposed blocks upon reversal of direction of rotation of said bearing, and means cooperating with diametrically opposed blocks to prevent relative rotation thereof with respect to each other, whereby to prevent shift of position of one block without corresponding shift of position of a diametrically opposed block.

14. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, said stationary bearing member being formed with diametrically opposed portions of reduced thickness so as to provide diametrically opposed deformable zones therein for facilitating shift of position of diametrically opposed blocks upon reversal of direction of rotation of said bearing, and means cooperating with diametrically opposed blocks to prevent relative rotation thereof with respect to each other, whereby to prevent shift of position of one block without corresponding shift of position of a diametrically opposed block.

15. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, a stationary supporting member for supporting said stationary bearing member, said supporting member being formed with diametrically opposed portions of reduced thickness so as to provide diametrically oppposed unsupported deformable zones in said stationary bearing member for facilitating shift of position of diametrically opposed blocks upon reversal of direction of rotation of said bearing, and means cooperating with diametrically opposed blocks to prevent relative rotation thereof with respect to each other, whereby to prevent shift of position of one block without corresponding shift of position of a diametrically opposed block.

16. An axial thrust bearing of the type having sliding bearing blocks comprising a bearing member having a smooth uninterrupted surface with respect to which the bearing blocks are adapted to slide, and means for tilting the blocks one way for rotation in one direction and the other way for rotation in the opposite direction, said member having diametrically opposed portions of reduced thickness for providing deformable zones through which opposed bearing blocks are adapted to pass concurrently for facilitating change in tilting of the blocks upon reversal of direction of rotation.

17. An axial thrust bearing of the type having sliding bearing blocks comprising a bearing member having a smooth uninterrupted surface with respect to which the bearing blocks are adapted to slide, and means for tilting the blocks one way for rotation in one direction and the other way for rotation in the opposite direction, said member having a portion of reduced thickness for providing a deformable zone through which the bearing blocks are adapted to pass for facilitating change in tilting of the blocks upon reversal of direction of rotation.

18. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, and a stationary supporting member for supporting said stationary bearing member, one of said stationary members being formed with a portion having less total thickness of material in axial direction than the major portion of the member so as to provide a deformable zone in said stationary bearing member for facilitating said shift of position upon reversal of direction of rotation of the bearing.

19. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, and said stationary bearing member being formed with a portion having less total thickness of material in axial direction than the major portion of the member so as to provide a deformable zone therein for facilitating said shift of position upon reversal of direction of rotation of the bearing.

20. An axial thrust bearing of the type having sliding bearing blocks comprising a bearing member having a smooth uninterrupted surface with respect to which the bearing blocks are adapted to slide, and means for tilting the blocks one way for rotation in one direction and the other way for rotation in the opposite direction, said member having a portion of less total thickness of material in axial direction than the major portion of the member for providing a deformable zone through which the bearing blocks are adapted to pass for facilitating change in tilting of the blocks upon reversal of direction of rotation.

21. An axial thrust bearing of the type having sliding bearing blocks comprising a bearing member having a smooth uninterrupted surface with respect to which the bearing blocks are adapted to slide, and means for tilting the blocks one way for rotation in one direction and the other way for rotation in the opposite direction, said member having diametrically opposed portions of less total thickness of material in axial direction than the remaining portions for providing deformable zones through which opposed bearing blocks are adapted to pass concurrently for facilitating change in tilting of the blocks upon reversal of direction of rotation.

22. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, and a stationary supporting member for supporting said stationary bearing member, one of said stationary members being formed with a weakened portion so as to provide a deformable zone in said stationary bearing member for facilitating said shift of position upon reversal of direction of rotation of the bearing.

23. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, the bearing surface of said stationary member being smooth and uninterrupted, and said stationary bearing member being formed with a weakened portion so as to provide a deformable zone therein for facilitating said shift of position upon reversal of direction of rotation of the shaft.

24. An axial thrust bearing of the type having sliding bearing blocks comprising a bearing member having a smooth uninterrupted surface with respect to which the bearing blocks are adapted to slide, and means for tilting the blocks one way for rotation in one direction and the other way for rotation in the opposite direction, said member having a weakened portion for providing a deformable zone through which the bearing blocks are adapted to pass for facilitating change in tilting of the blocks upon reversal of direction of rotation.

25. An axial thrust bearing of the type having sliding bearing blocks comprising a bearing member having a smooth uninterrupted surface with respect to which the bearing blocks are adapted to slide, and means for tilting the blocks one way for rotation in one direction and the other way for rotation in the opposite direction, said member having diametrically opposed weakened portions for providing deformable zones through which opposed bearing blocks are adapted to pass concurrently for facilitating change in tilting of the blocks upon reversal of direction of rotation.

26. An axial thrust bearing of the type having sliding bearing blocks comprising a bearing member having a surface with respect to which the bearing blocks are adapted to slide, and means for tilting the blocks one way for rotation in one direction and the other way for rotation in the opposite direction, said member having a portion of reduced thickness formed by a recess in a surface of said member opposite said first mentioned surface for providing a deformable zone through which the bearing blocks are adapted to pass for facilitating change in tilting of the blocks upon reversal of direction of rotation.

27. A bearing of the character described comprising relatively rotatable bearing members, a plurality of bearing blocks having operative positions between said members, one of said members and said blocks having cooperating surfaces for causing rotation in one direction to tilt the blocks one way and rotation in the other direction to tilt the blocks the other way, means for permitting and limiting shift of position between said blocks and said one of said members, the other of said members and said blocks having cooperating bearing surfaces, and means providing a deformable zone for facilitating said shift of position upon reversal of direction of rotation of the bearing.

28. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces and said stationary bearing member being formed with a recess spaced from the bearing surface thereof so as to provide a deformable zone therein for said shift of position upon reversal of direction of rotation of the bearing.

29. A bearing of the character described comprising a rotatable bearing member, a stationary bearing member, a plurality of bearing blocks having operative positions between said members, said rotatable member and said blocks having cooperating surfaces for causing rotation in one direction to tilt the blocks one way and rotation in the other direction to tilt the blocks the other way, means for permitting and limiting shift of position between said blocks and said rotatable bearing member, said stationary bearing member and said blocks having cooperating bearing surfaces, and a stationary supporting member for supporting said stationary bearing member, said supporting member being formed with a portion of reduced thickness so as to provide an unsupported deformable zone in said stationary bearing member for facilitating said shift of position upon reversal of direction of rotation of the bearing.

AUGUST GUNNAR FERDINAND WALLGREN.